US008355222B2

(12) United States Patent
Mino et al.

(10) Patent No.: US 8,355,222 B2
(45) Date of Patent: Jan. 15, 2013

(54) PERPENDICULAR MAGNETIC WRITE HEAD INCLUDING HIGH MAGNETIC MOMENT SEED LAYER FOR TRAILING SHIELD THEREIN AND/OR METHOD OF MAKING THE SAME

(75) Inventors: Tetsuya Mino, Hong Kong (CN); Naoto Matono, Hong Kong (CN); Ikuhito Onodera, Hong Kong (CN); Kazushi Nishiyama, Hong Kong (CN); Michitoshi Tsuchiya, Hong Kong (CN); Kenji Sasaki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 296 days.

(21) Appl. No.: 12/801,904

(22) Filed: Jun. 30, 2010

(65) Prior Publication Data
US 2012/0002326 A1 Jan. 5, 2012

(51) Int. Cl.
*G11B 5/11* (2006.01)
*G11B 5/23* (2006.01)
(52) U.S. Cl. ........... 360/125.3; 360/119.03; 360/119.04; 29/603.13; 29/603.14
(58) Field of Classification Search ............. 360/119.03, 360/119.04, 125.3; 29/603.07, 603.13, 603.14, 29/603.15
See application file for complete search history.

(56) References Cited

U.S. PATENT DOCUMENTS

| 2006/0198049 A1* | 9/2006 | Sasaki et al. ............ 360/126 |
| 2011/0097601 A1* | 4/2011 | Bai et al. .................. 428/815 |
| 2011/0151279 A1* | 6/2011 | Allen et al. ............... 428/815 |
| 2012/0127612 A1* | 5/2012 | Shin et al. ............. 360/123.12 |

FOREIGN PATENT DOCUMENTS

| JP | 2004-348928 | 12/2004 |
| JP | 2007-250074 | 9/2007 |
| JP | 2007-257711 | 10/2007 |

* cited by examiner

*Primary Examiner* — Jefferson Evans
(74) *Attorney, Agent, or Firm* — Nixon & Vanderhye PC (57) ABSTRACT

A perpendicular magnetic write head includes: a magnetic pole; a pair of nonmagnetic side gap layers provided on both sides in a track-width direction of the magnetic pole; a nonmagnetic trailing gap layer provided on a trailing side of the magnetic pole; a magnetic shield layer so provided as to surround the magnetic pole with both of the nonmagnetic side gap layer and the nonmagnetic trailing gap layer in between; and a magnetic seed layer formed between the nonmagnetic trailing gap layer and the magnetic shield layer, and having a saturation magnetic flux density higher than that of the magnetic shield layer. The magnetic seed layer is not formed between the nonmagnetic side gap layer and the magnetic shield layer.

3 Claims, 11 Drawing Sheets

PERPENDICULAR MAGNETIC WRITE HEAD INCLUDING HIGH MAGNETIC MOMENT SEED LAYER FOR TRAILING SHIELD THEREIN AND/OR METHOD OF MAKING THE SAME

BACKGROUND OF THE INVENTION

1. Field of the Invention

The invention relates to a perpendicular magnetic write head including a magnetic shield layer provided on a magnetic pole through a nonmagnetic gap layer, and a method of manufacturing the same.

2. Description of the Related Art

In recent years, an improvement in performance of a magnetic write head has been demanded, due to an increase in an areal recording density of a magnetic recording medium (hereinafter, referred to as a "recording medium") typified by a hard disk. To address this, a perpendicular magnetic write head, in which a direction of a signal magnetic field is set in a direction intersecting a surface of the recording medium, has been developed. The reason is that there are such advantages that a linear recording density increases, and a recording medium on which recording has been already performed is less susceptible to thermal fluctuation.

A perpendicular magnetic write head is provided with a main magnetic-pole layer for leading a magnetic flux generated in a thin-film coil to a recording medium. The main magnetic-pole layer includes a tip portion (a magnetic pole) having a fine width, which releases the magnetic flux to generate a magnetic field for recording (a perpendicular magnetic field). The perpendicular magnetic write head is arranged with a magnetic shield layer for recording, which is provided on the magnetic pole through a nonmagnetic gap layer, in order to increase a magnetic field gradient in a track-width direction (a cross-track direction) and in a direction intersecting thereto (a down-track direction).

More specifically, a metal-coating foundation layer is formed in three directions of a main magnetic-pole portion through a gap layer, and a shield layer is so formed as to surround the main magnetic-pole portion from the three directions by using the metal-coating foundation layer (for example, see Japanese Unexamined Patent Application Publication No. 2004-348928). The three directions here refer to both sides in the cross-track direction and to a trailing side in the down-track direction. Also, a pair of metal-coating foundation film are so formed as to sandwich the main-magnetic pole from above and below, in which one of the metal-coating foundation films is used to form a trailing shield, and a pair of side shields are so formed as to sandwich the main-magnetic pole from both sides through a nonmagnetic insulating film (for example, see Japanese Unexamined Patent Application Publication No. 2007-257711). In this case, a nonmagnetic material such as gold (Au), ruthenium (Ru), rhodium (Ru), or platinum (Pt) is used as a formation material of the metal-coating foundation film. Incidentally, a magnetic material such as a nickel-iron-cobalt alloy (NiFeCo), a cobalt-iron alloy (CoFe), or a nickel-iron alloy (NiFe) may also be used as the metal-coating foundation film (for example, see Japanese Unexamined Patent Application Publication No. 2007-250074).

In these days, the areal recording density of the recording medium is increasing more and more, and thus a perpendicular magnetic write head, which can address the increase in the areal recording density, has been desired to appear. However, in the perpendicular magnetic write head in which a recording process is performed substantially in a trailing edge of a magnetic pole, an increase in a magnetic field gradient and a suppression of generation of a side erase are in a trade-off relationship. Thus, it is difficult to satisfy both of them at the same time, since the side erase tends to occur easily in the cross-track direction when a magnetic field intensity is increased to increase the magnetic field gradient in the down-track direction, whereas the magnetic field gradient decreases in the down-track direction when the magnetic field intensity is decreased to suppress the generation of the side erase.

For these reasons, it has been strongly desired to increase the magnetic field gradient of the perpendicular magnetic field, while suppressing the generation of the side erase.

SUMMARY OF THE INVENTION

A perpendicular magnetic write head according to the invention includes: a magnetic pole; a pair of nonmagnetic side gap layers provided on both sides in a track-width direction of the magnetic pole; a nonmagnetic trailing gap layer provided on a trailing side of the magnetic pole; a magnetic shield layer so provided as to surround the magnetic pole with both of the nonmagnetic side gap layer and the nonmagnetic trailing gap layer in between; and a magnetic seed layer formed between the nonmagnetic trailing gap layer and the magnetic shield layer, and having a saturation magnetic flux density higher than that of the magnetic shield layer. The magnetic seed layer is not formed between the nonmagnetic side gap layer and the magnetic shield layer.

A method of manufacturing a perpendicular magnetic write head according to the invention includes: forming a magnetic pole; forming a pair of nonmagnetic side gap layers on both sides in a track-width direction of the magnetic pole, as well as a nonmagnetic trailing gap layer on a trailing side of the magnetic pole; forming a magnetic seed layer on the nonmagnetic side gap layer and on the nonmagnetic trailing gap layer; selectively removing a layer portion formed on the nonmagnetic side gap layer, of the magnetic seed layer covering both the nonmagnetic side gap layer and the nonmagnetic trailing gap layer; and so forming a magnetic shield layer as to surround the magnetic pole with the nonmagnetic side gap layer, the nonmagnetic trailing gap layer, and a remaining portion of the magnetic seed layer in between, wherein a material with a saturation magnetic flux density higher than that of the magnetic shield layer is used for formation of the magnetic seed layer.

According to the perpendicular magnetic write head or the method of manufacturing the same of the invention, the magnetic shield layer is so formed as to surround the magnetic pole with both of the nonmagnetic side gap layer and the nonmagnetic trailing gap layer in between, and the magnetic seed layer, having the saturation magnetic flux density higher than that of the magnetic shield layer, is formed between the nonmagnetic trailing gap layer and the magnetic shield layer. That is, the magnetic seed layer of the high saturation magnetic flux density is formed between the nonmagnetic trailing gap layer and the magnetic shield layer, whereas the magnetic seed layer of the high saturation magnetic flux density is not formed between the nonmagnetic side gap layer and the magnetic shield layer. Thereby, in a down-track direction, a magnetic flux released from the magnetic pole becomes more likely to be absorbed in the magnetic seed layer, so that a magnetic field gradient of a perpendicular magnetic field increases. Also, the magnetic flux released from the magnetic pole becomes less likely to spread in a cross-track direction even when the magnetic seed layer is formed, so that a side erase is less likely to be generated. Therefore, it is possible to increase the magnetic field gradient while suppressing the generation of the side erase.

DETAILED DESCRIPTION OF THE PREFERRED EMBODIMENTS

In the following, an embodiment of the invention will be described in detail with reference to the drawings.

[Overall Configuration of Thin-Film Magnetic Head]

First, a configuration of a thin-film magnetic head utilizing a perpendicular magnetic write head according to one embodiment of the invention will be described.

Figure 1A:
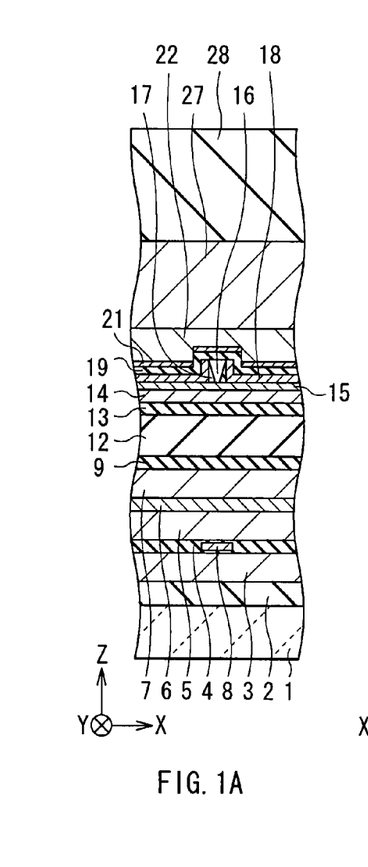
FIG. 1A and FIG. 1B are cross-sectional views illustrating a configuration of a thin-film magnetic head provided with a perpendicular magnetic write head according to an embodiment of the invention.
Figure 1B:
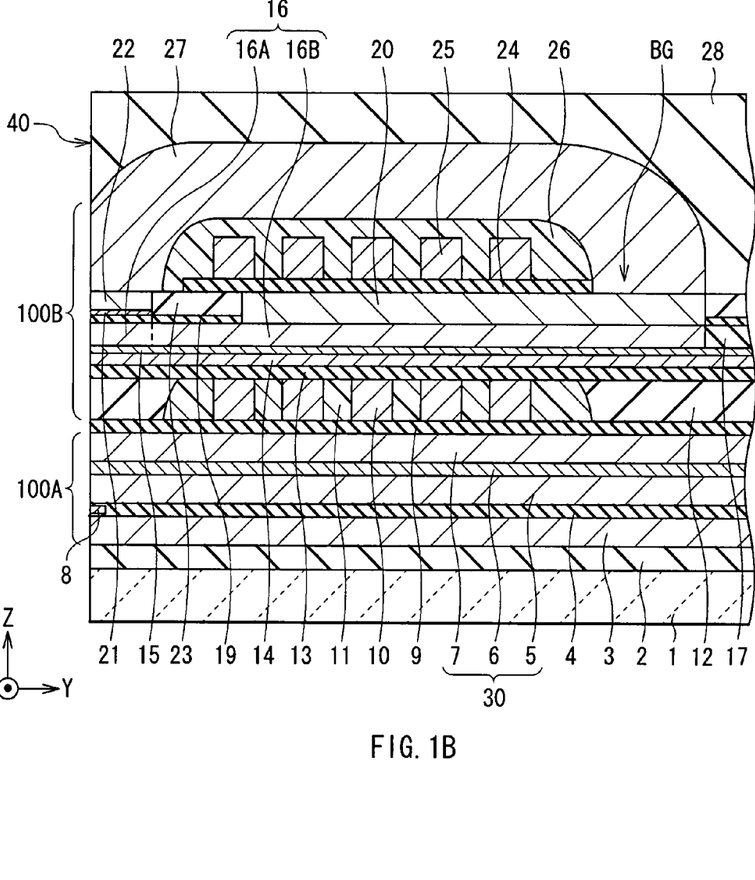

FIGS. 1A and 1B illustrate a configuration of the thin-film magnetic head. FIG. 1A illustrates a cross section parallel to an air bearing surface 40, whereas FIG. 1B illustrates a cross section perpendicular to the air bearing surface 40.

In the description below, dimensions in an X-axis direction, a Y-axis direction, and a Z-axis direction are referred to as "width", "length", and "thickness", respectively. A side close to the air bearing surface 40 in the Y-axis direction is referred to as "front", whereas a side away from the air bearing surface 40 in the Y-axis direction is referred to as "rear".

Also, an upper side and a lower side in the Z-axis direction indicated in FIGS. 1A and 1B are referred to as a "trailing side" and a "leading side", respectively. Further, the X-axis direction and the Z-axis direction are referred to as a "cross-track direction (or a track-width direction)" and a "down-track direction", respectively.

The thin-film magnetic head described here applies a magnetic process to a recording medium (not illustrated) such as a hard disk, and is, for example, a composite head capable of performing both a reproducing process and a recording process.

The thin-film magnetic head has, for example, a configuration in which an insulating layer 2, a read head portion 100A, a magnetic separating layer 9, a write head portion 100B, and an overcoat layer 28 are stacked in this order on the substrate 1, and has the air bearing surface 40 as a one side face. The air bearing surface 40 lies in a same plane as a one end face of a main magnetic-pole layer 16.

The substrate 1 is formed by a ceramic material such as AlTiC ($Al_2O_3$.TiC), for example. The insulating layer 2, the magnetic separating layer 9, and the overcoat layer 28 are formed by a nonmagnetic insulating material such as aluminum oxide ($AlO_x$), for example. The aluminum oxide is alumina ($Al_2O_3$) or the like, for example.

The read head portion 100A performs the reproducing process by utilizing a magnetoresistive effect (MR: magneto-resistive effect), and has, for example, a configuration in which a bottom lead shield layer 3, a shielding gap layer 4, and a top lead shield layer 30 are stacked in this order. In the shielding gap layer 4, a reproducing element (an MR element 8) is so buried as to have a one end face, which lies in a same plane as the air bearing surface 40.

The bottom lead shield layer 3 is formed by a magnetic material such as an alloy of nickel and iron (NiFe), for example. The nickel-iron alloy is, for example, Permalloy (trade name) in which the content of nickel and the content of iron are 80 weight % and 20 weight %, respectively. The top lead shield layer 30 has a configuration in which magnetic layers 5 and 7 are stacked with a nonmagnetic layer 6 in between, for example. The magnetic layers 5 and 7 are formed by a magnetic material such as Permalloy, for example. The nonmagnetic layer 6 is formed by a nonmagnetic conductive material such as ruthenium (Ru), or formed by a nonmagnetic insulating material such as alumina, for example. Incidentally, the top lead shield layer 30 may be a monolayer made of a magnetic material.

The shielding gap layer 4 is configured of, for example, a nonmagnetic insulating material such as alumina. The MR element 8 utilizes a giant magnetoresistive effect (GMR: giant magneto-resistive effect), a tunneling magnetoresistive effect (TMR: tunneling magneto-resistive effect), or the like.

The write head portion 100B is a perpendicular magnetic write head which performs the recording process of a perpendicular magnetic recording scheme. The write head portion 100B has, for example, a configuration in which a thin-film coil 10 buried by coil-insulating layers 11 to 13, an auxiliary write shield layer 14, a nonmagnetic foundation layer 15, a main magnetic-pole layer 16, a nonmagnetic adjoining layer 17, a nonmagnetic protruding layer 18, a nonmagnetic gap layer 19, an auxiliary magnetic-pole layer 20, a magnetic seed layer 21, a main write shield layer 22 (a magnetic shield layer), an embedded insulating layer 23, a thin-film coil 25 buried by coil-insulating layers 24 and 26, and a return yoke layer 27, are stacked in this order.

The thin-film coil 10 is, for example, formed by a highly-conductive material such as copper (Cu), and has a spiral structure which is wound about a back gap BG.

The coil-insulating layer 11 is provided in a gap between windings of the thin-film coil 10 and around the windings. The coil-insulating layer 11 is formed by a nonmagnetic insulating material such as a photoresist or a spin-on-glass (SOG: Spin On Glass) which exhibits fluidity at the time of heating, for example. The coil-insulating layer 12 is provided around the coil-insulating layer 11, and the coil-insulating layer 13 is so provided as to cover the thin-film coil 10 and the coil-insulating layers 11 and 12. The coil-insulating layers 12 and 13 are formed by a nonmagnetic insulating material such as alumina, for example.

The auxiliary write shield layer 14 is a write shield layer (a so-called leading shield layer) provided on the leading side of the main magnetic-pole layer 16 through a magnetic gap (the nonmagnetic foundation layer 15), and is formed by a magnetic material similar to that of the main magnetic-pole layer 16, for example. However, the auxiliary write shield layer 14 may be formed by a magnetic material different from that of the main magnetic-pole layer 16. The fact that the formation may be achieved by the magnetic material different from that of the main magnetic-pole layer 16 as above is applicable to the later-described auxiliary magnetic-pole layer 20, the main write shield layer 22, and the return yoke layer 27 as well. Herein, the auxiliary write shield layer 14 is formed by Permalloy or the like, for example.

The nonmagnetic foundation layer 15 is formed by a nonmagnetic conductive material such as a nickel-chromium alloy (NiCr), or a nonmagnetic insulating material such as alumina, for example.

The main magnetic-pole layer 16 is formed, for example, by a magnetic material having high saturation magnetic flux density such as an iron-based alloy. The iron-based alloy is a nickel-iron-cobalt alloy (NiFeCo), a cobalt-iron alloy (CoFe), a nickel-iron alloy (NiFe), a cobalt-nickel-iron alloy (CoNiFe), or the like, for example. The main magnetic-pole layer 16 extends rearward from the air bearing surface 40, and includes a tip portion 16A having a narrower width and a rear end portion 16B having a wider width, in order from a side closer to the air bearing surface 40. The tip portion 16A is a so-called magnetic pole, and a width thereof may be uniform in a length direction, or may be widened gradually with increasing distance from the air bearing surface 40, for example. A width of the rear end portion 16B may be uniform in a length direction, or may be widened with increasing distance from the tip portion 16A and may then become uniform, as long as the width thereof is wider than the width of the tip portion 16A.

The nonmagnetic adjoining layer 17 and the nonmagnetic gap layer 19 are formed by a nonmagnetic insulating material such as alumina, for example.

The nonmagnetic protruding layer 18 is protruded from the air bearing surface 40 so as to allow the main magnetic-pole layer 16 not to contact with the recording medium. The nonmagnetic protruding layer 18 is formed by a nonmagnetic material whose etching rate is slower than that of the main magnetic-pole layer 16, for example. The nonmagnetic material is, for example, at least one kind of material of metal materials and alloy materials, for example. The metal material is, for example, ruthenium, titanium (Ti), tantalum (Ta), tungsten (W), chromium (Cr) or the like. The alloy material is, for example, an alloy which includes one or more kinds of metallic elements described as the metal materials, and more specifically, such as a nickel-chromium alloy. However, the metal material and the alloy material each may contain elements other than the metallic elements (nonmetallic element). Also, the nonmagnetic protruding layer 18 may be either a monolayer or a multilayer.

The "etching rate is slower than that of the main magnetic-pole layer 16" means that a rate of progression of an etching process becomes slower in the nonmagnetic protruding layer 18 than in the main magnetic-pole layer 16 when the main magnetic-pole layer 16 and the nonmagnetic protruding layer 18 are etched together by using an ion-milling method, a plasma etching method, or the like. Namely, the nonmagnetic protruding layer 18 is more difficult to be etched than the main magnetic-pole layer 16.

The auxiliary magnetic-pole layer 20 is formed by a magnetic material similar to that of the main magnetic-pole layer 16, for example. The auxiliary magnetic-pole layer 20 extends rearward from a position recessed from the air bearing surface 40 in the trailing side of the main magnetic-pole layer 16, and is coupled to the main magnetic-pole layer 16.

The magnetic seed layer 21 is used for forming the main write shield layer 22 at the time before completion (manufacturing process) of the thin-film magnetic head, and functions similarly as the main write shield layer 22 after the completion of the same. The magnetic seed layer 21 is formed by a magnetic material having a saturation magnetic flux density higher than that of the main write shield layer 22. Such a magnetic material is, for example, similar to the formation material of the main magnetic-pole layer 16.

The main write shield layer 22 is a write shield layer (a so-called trailing shield layer-side shield layer) provided in three directions including both sides in the track-width direction and the trailing side of the main magnetic-pole layer 16 through the magnetic gap (the nonmagnetic gap layer 19). For example, the main write shield layer 22 is formed by a magnetic material similar to that of the main magnetic-pole layer 16. However, not only the nonmagnetic gap layer 19 here but also the nonmagnetic adjoining layer 17 and the nonmagnetic protruding layer 18 may function as the magnetic gap as well.

The embedded insulating layer 23 is formed by a nonmagnetic insulating material such as alumina, and a part thereof is embedded between the auxiliary magnetic-pole layer 20 and the main write shield layer 22, for example.

A formation material and a configuration of the thin-film coil 25 are similar to those of the thin-film coil 10, for example.

The coil-insulating layer 24 is provided between the auxiliary magnetic-pole layer 20 and the thin-film coil 25, and is formed by a nonmagnetic insulating material similar to that of the coil-insulating layers 12 and 13, for example. The coil-insulating layer 26 is provided in a gap between windings of the thin-film coil 25 and around the windings, and is formed by a nonmagnetic insulating material similar to that of the coil-insulating layer 11, for example. Incidentally, the coil-insulating layers 24 and 26 are coupled to the embedded insulating layer 23, and forefront edges of the coil-insulating layers 24 and 26 are recessed from a forefront edge of the embedded insulating layer 23, for example.

The return yoke layer 27 is formed by a magnetic material similar to that of the main magnetic-pole layer 16, for example. The return yoke layer 27 extends rearward from the air bearing surface 40 on the trailing side of the auxiliary magnetic-pole layer 20 and the main write shield layer 22, and is coupled to the main write shield layer 22 on a front portion thereof while coupled to the auxiliary magnetic-pole layer 20 on a rear portion (the back gap BG) thereof.

[Configuration of Main Part of Thin-Film Magnetic Head]

Next, a detailed configuration of the thin-film magnetic head will be described.

Figure 2:
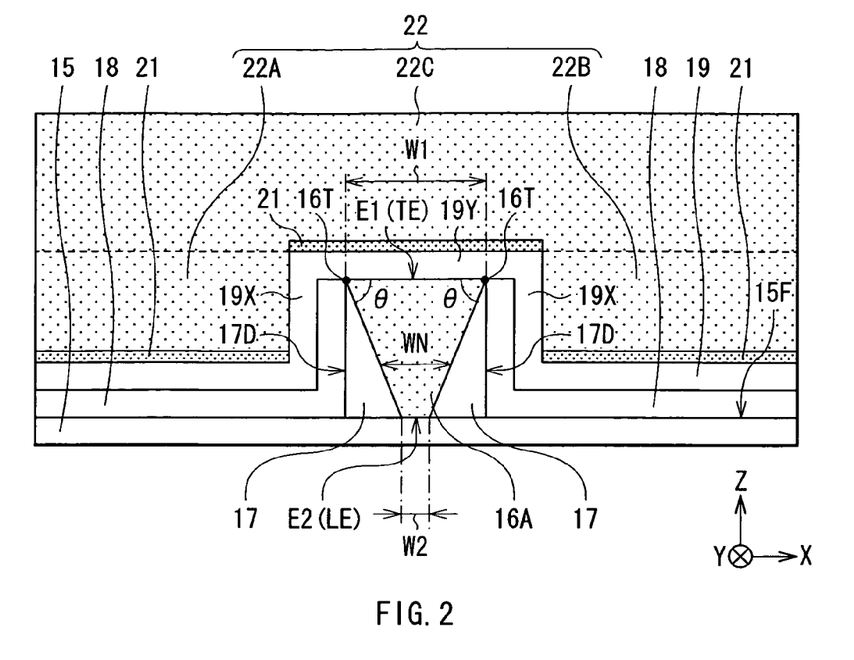
FIG. 2 is a view illustrating, in an enlarged fashion, a configuration in an end face of a thin-film magnetic head on an air bearing surface.

FIG. 2 illustrates a configuration of an end face, in the air bearing surface 40, of a main part of the thin-film magnetic head in an enlarged fashion. Incidentally, elements having a magnetic property among a series of elements are shaded in FIG. 2.

As described above, the air bearing surface 40 lies in the same plane as the one end face of the main magnetic-pole layer 16 (the tip portion 16A). Thus, a position of the air bearing surface 40 coincides with a position of a one end face of the tip portion 16A in a direction in which the thin-film magnetic head approaches the recording medium (the Y-axis direction).

The one end face of the tip portion 16A has a width which is larger on a side far from the nonmagnetic foundation layer 15 than on a side close to the nonmagnetic foundation layer 15, for example. Thus, a shape of the one end face is, for example, a shape which has an end edge E1 (a trailing edge TE) located on the trailing side and an end edge E2 (a leading edge LE) located on the leading side, and in which a width W1 of the trailing edge TE is larger than a width W2 of the leading edge LE.

In the one end face of the tip portion 16A, when comparing the widths W1 and W2 with a width WN at an arbitrary position between the trailing edge TE and the leading edge LE, the width W1 is larger than the width W2, and the width W1 is equal to or larger than the width "WN". The width W2 may be larger than zero, or may be substantially zero. A case where the width W2 is larger than zero means that the shape of the one end face is a shape in which the end edge E2 serves as one side, whereas a case where the width W2 is substantially zero means that the shape of the one end face is a shape in which the end edge E2 serves as a vertex of angular portions. Incidentally, a cross-sectional configuration of the tip portion 16A may be the same as that of the shape of the one end face, or may be different therefrom.

Here, the shape of the one end face of the tip portion 16A is a trapezoid (an inverted trapezoid) where the end edge E1 is an upper base (a long side) and the end edge E2 is a lower base (a short side), for example. A bevel angle θ of the one end face (an angle of gradient of the side ends) is optional. However, the shape of the one end face can be rectangle or triangle (an inverted triangle) other than the trapezoid.

The nonmagnetic adjoining layer 17 is adjacent to the tip portion 16A on both sides in the track-width direction (the X-axis direction), and has side faces 17D on sides (outer sides) which are not adjacent to the tip portion 16A. Outermost edge portions 16T in the track-width direction of the tip portion 16A are located in a plane including the side faces 17D (within the same plane as the side faces 17D). Incidentally, although the side face 17D may be inclined relative to a surface plane 15F of the nonmagnetic foundation layer 15, it is preferable that an angle of inclination thereof be as small as possible, and it is more preferable that the side face 17D be perpendicular to the surface plane 15F, since this makes it easier to control a thickness of the nonmagnetic gap layer 19 with a high degree of accuracy in a manufacturing process of the thin-film magnetic head.

The nonmagnetic protruding layer 18 is formed at least a part of surroundings of the tip portion 16A as viewed from the recording medium side. In particular, it is preferable that the nonmagnetic protruding layer 18 be formed at least a part of the both sides in the track-width direction and the trailing side of the tip portion 16A. That is, a position at which the nonmagnetic protruding layer 18 is formed may be on both sides of the tip portion 16A, only on one side thereof, only on the trailing side of the tip portion 16A, or a combination of two or more thereof.

Here, the nonmagnetic protruding layer 18 is formed on both sides of the tip portion 16A, and so opposed to each other as to sandwich the tip portion 16A, for example. More specifically, the nonmagnetic protruding layer 18 is so formed as to cover the side faces 17D of the nonmagnetic adjoining layer 17, for example. In this case, the nonmagnetic protruding layer 18 may be so formed as to cover the side faces 17D together with the surface plane 15F of the nonmagnetic foundation layer 15 in the periphery thereof.

An amount of protrusion (a protrusion length) of the nonmagnetic protruding layer 18 protruding from the tip portion 16A (the air bearing surface 40) is not particularly limited. However, it is preferable that the protrusion length be at a value which is large to an extent capable of preventing an excessive contact of the tip portion 16A with the recording medium, and which is small to an extent in which the write head portion 100B can apply the recording process properly to the recording medium. For example, when the tip portion 16A is formed by an iron-based alloy such as a nickel-iron-cobalt alloy, the nonmagnetic protruding layer 18 preferably includes ruthenium, titanium, tantalum, tungsten, chromium, or a nickel-chromium alloy, and more preferably includes ruthenium or titanium.

The nonmagnetic gap layer 19 is formed in three directions, including the both sides in the track-width direction and the trailing side of the tip portion 16A as the magnetic pole. Here, the nonmagnetic gap layer 19 is formed between the tip portion 16A and the main write shield layer 22, and between the nonmagnetic protruding layer 18 and the main write shield layer 22, for example. In this case, the nonmagnetic gap layer 19 may be formed to a periphery of the nonmagnetic adjoining layer 17 (the side face 17D) as with the nonmagnetic protruding layer 18.

In the nonmagnetic gap layer 19, portions located on the both sides of the tip portion 16A are a pair of nonmagnetic side gap layers 19X, and a portion located on the trailing side of the tip portion 16A is a nonmagnetic trailing gap layer 19Y (a so-called write gap).

The magnetic seed layer 21 is formed only on the nonmagnetic trailing gap layer 19Y in the nonmagnetic gap layer 19 formed in the three directions of the tip portion 16A, and is not formed on the nonmagnetic side gap layers 19X. Thus, the magnetic seed layer 21 is interposed between the nonmagnetic trailing gap layer 19Y and the main trailing shield layer 22 in the trailing side of the tip portion 16A, whereas the magnetic seed layer 21 is not interposed between the nonmagnetic side gap layer 19X and the main trailing shield layer 22 on the both sides of the tip portion 16A. In this case, when the nonmagnetic gap layer 19 is formed to the periphery of the nonmagnetic adjoining layer 17 (the side face 17D) as described above, the magnetic seed layer 21 may be so formed as to cover the nonmagnetic gap layer 19 in the periphery thereof.

The main write shield layer 22 includes a pair of side shield layers 22A and 22B provided adjacently to the tip portion 16A in the track-width direction through the nonmagnetic gap layer 19 (the pair of nonmagnetic side gap layers 19X), and a trailing shield layer 22C provided on the trailing side of the tip portion 16A through the nonmagnetic gap layer 19 (the nonmagnetic trailing gap layer 19Y). Here, the side shield layers 22A, 22B and the trailing shield layer 22C are integrated, for example. The "integrated" means that the side shield layers 22A, 22B and the trailing shield layer 22C are formed in the same process, and that they are not detachable. However, the side shield layers 22A, 22B and the trailing shield layer 22C may be formed to be detachable in separate processes. Incidentally, a boundary between the side shield layers 22A, 22B and the trailing shield layer 20C is attached with a broken line in FIG. 2.

[Operation of Thin-Film Magnetic Head]

The thin-film magnetic head operates as follows.

In writing, a magnetic flux for recording is generated when a current flows in the thin-film coil 25 of the write head portion 100B. The magnetic flux flows through the inside of the main magnetic-pole layer 16 from the rear end portion 16B toward the tip portion 16A, and is focused in the vicinity of the trailing edge TE of the tip portion 16A. When the magnetic flux is released outside to generate a perpendicular magnetic field, the recording medium is magnetized by the perpendicular magnetic field, by which information is magnetically recorded.

In this case, a magnetic flux for suppressing leakage is generated in the thin-film coil 10. This makes the magnetic flux for recording less likely to flow to the read head portion 100A, so that a decrease in detection accuracy in the MR element 8 is suppressed. Also, an unintentional erasure of information recorded on the recording medium caused by an unnecessary magnetic field, generated due to absorption of the magnetic flux for recording in the bottom lead shield layer 3 and the top lead shield layer 30, is suppressed.

In particular, when the magnetic flux is released from the tip portion 16A, a part of the magnetic flux (a spread component) is absorbed in the main write shield layer 22, so that a magnetic field gradient of the perpendicular magnetic field increases in the down-track direction. The magnetic flux absorbed in the main write shield layer 22 is resupplied to the main magnetic-pole layer 16 through the return yoke layer 27.

Incidentally, the magnetic flux released from the tip portion 16A toward the recording medium returns to the return yoke layer 27 through the recording medium, and is resupplied to the main magnetic-pole layer 16. This makes the magnetic flux be circulated between the write head portion 100B and the recording medium, whereby a magnetic circuit is established.

On the other hand, in reading, when a sense current flows in the MR element 8 of the read head portion 100A, a resistance of the MR element 8 changes in response to a signal magnetic field for reproducing in the recording medium. This resistance change is detected as a voltage change, so that information recorded in the recording medium is reproduced magnetically.

[Method of Manufacturing Thin-Film Magnetic Head]

Next, a method of manufacturing the thin-film magnetic head will be described.

FIGS. 3 to 17 are for describing the method of manufacturing the thin-film magnetic head, and each illustrate a cross-sectional configuration corresponding to FIG. 2. In the following, since the formation material, dimension, configuration, and the like of a series of elements have been already described, description thereof will be omitted as needed.

The thin-film magnetic head is manufactured by sequentially forming and stacking the series of elements mainly with use of an existing thin-film process. The existing thin-film process means, for example, a film-forming technique such as a plating method and a sputtering method, a patterning technique such as a photolithography method, an etching technique such as a dry-etching method and a wet-etching method, and a polishing method such as a chemical-mechanical polishing (CMP: chemical mechanical polishing) method. However, techniques other than the above may be used.

Figure 3:
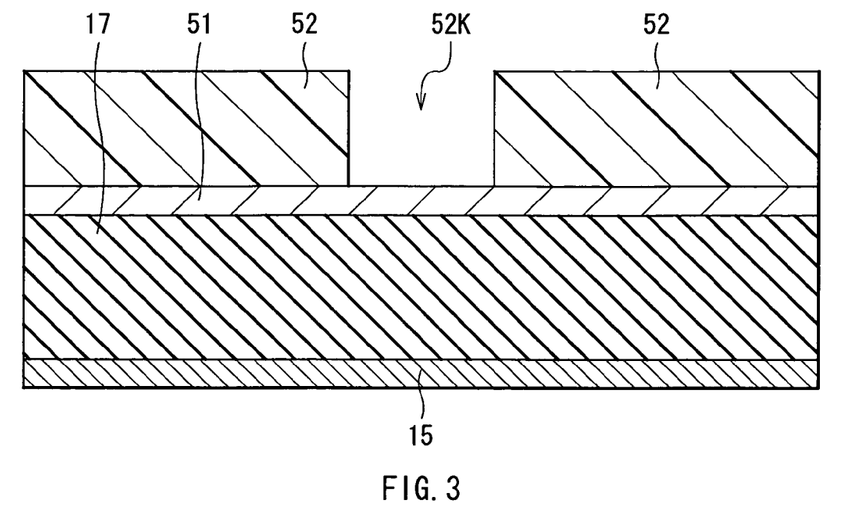
FIG. 3 is a cross-sectional view for describing a method of manufacturing the thin-film magnetic head.

As illustrated in FIG. 3, when forming the main part of the thin-film magnetic head, a sputtering method or the like is used to first form the nonmagnetic foundation layer 15 on the substrate 1 (not illustrated in FIG. 3), where the read head portion 100A and so on are formed. In this case, it is preferable that a material, by which the nonmagnetic foundation layer 15 can be utilized as an etching stop layer in performing an etching process by using a reactive-ion etching (RIE: reactive ion etching) method or the like in a later process (for example, a nickel-chrome alloy etc.), be used, for example.

Then, a sputtering method or the like is used to form the nonmagnetic adjoining layer 17 on the nonmagnetic foundation layer 15, and thereafter, a sputtering method or the like is used to form a mask layer 51 on the nonmagnetic adjoining layer 17. In this case, a metal material such as ruthenium, or an alloy material such as a nickel-chromium alloy, is used as a formation material of the mask layer 51, for example.

Then, a photolithography method is used to form a photoresist pattern 52 having an opening 52K on the mask layer 51. In this case, a photoresist is applied on a surface of the mask layer 51 to form a photoresist film (not illustrated), and thereafter, the photoresist film is patterned (exposed and developed), for example.

Figure 4:
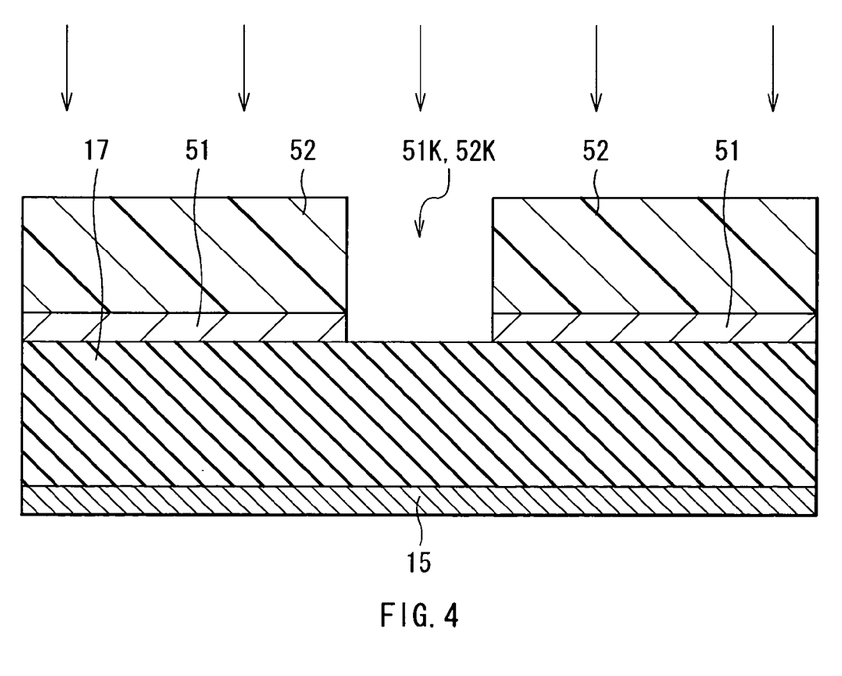
FIG. 4 is a cross-sectional view for describing a process subsequent to that of FIG. 3.

Then, as illustrated in FIG. 4, an ion-milling method or the like is used to etch the mask layer 51 by utilizing the photoresist pattern 52 as a mask, to form an opening 51K.

Figure 5:
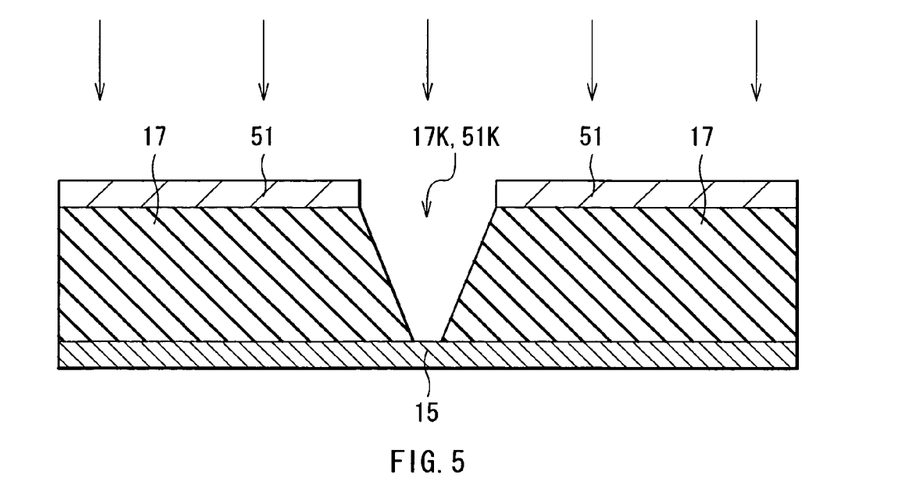
FIG. 5 is a cross-sectional view for describing a process subsequent to that of FIG. 4.

Then, as illustrated in FIG. 5, an ashing method or the like is used to remove the photoresist pattern 52, and thereafter, a RIE method or the like is used to etch the nonmagnetic adjoining layer 17 until the nonmagnetic foundation layer 15 is exposed, so as to form an opening 17K. In this case, since the nonmagnetic foundation layer 15 functions as the etching stop layer, the etching process substantially completes at the time when the nonmagnetic foundation layer 15 is exposed in the opening 17K, for example. In this etching process, the opening 17K becomes gradually narrower as approaching the nonmagnetic foundation layer 15, since etched materials (shaved nonmagnetic adjoining layer 17) are deposited as the etching process progresses.

Incidentally, the opening 17K may be so formed that the nonmagnetic foundation layer 15 is not exposed (a so-called depression) when etching the nonmagnetic adjoining layer 17.

Figure 6:
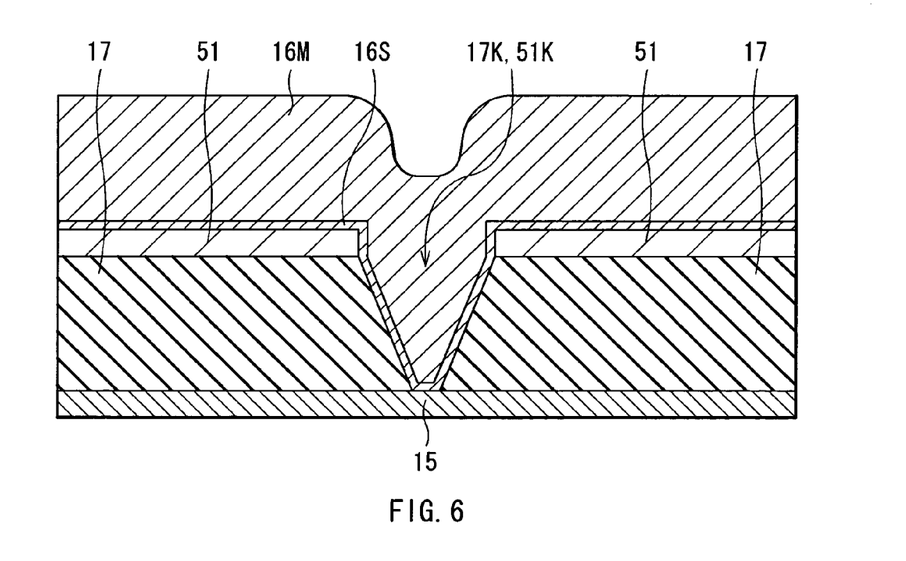
FIG. 6 is a cross-sectional view for describing a process subsequent to that of FIG. 5.
Figure 7:
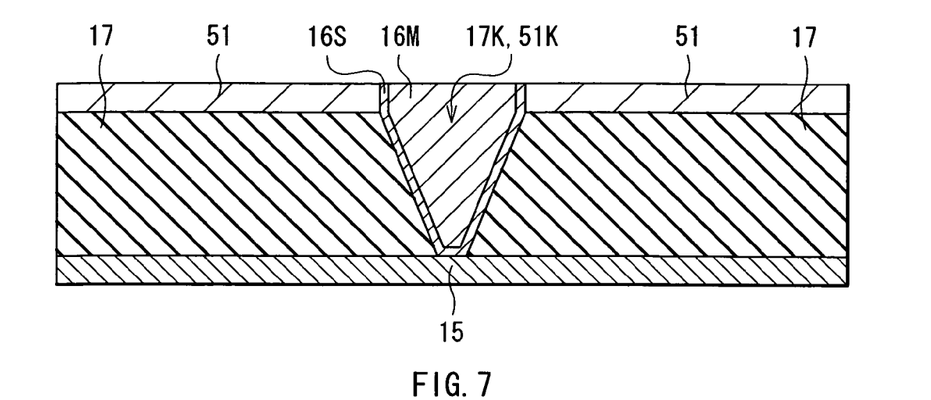
FIG. 7 is a cross-sectional view for describing a process subsequent to that of FIG. 6.
Figure 8:
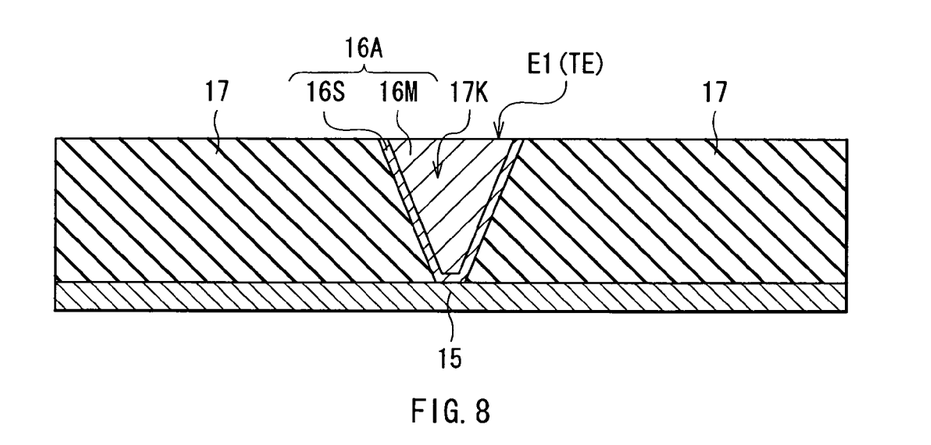
FIG. 8 is a cross-sectional view for describing a process subsequent to that of FIG. 7.

Then, as illustrated in FIGS. 6 to 8, the tip portion 16A is formed in the opening 17K. A formation procedure of the tip portion 16A is, for example, as follows.

First, as illustrated in FIG. 6, a sputtering method or the like is used to form a seed layer 16S in such a manner as to cover the inside of the opening 17K (an exposed surface of the nonmagnetic foundation layer 15 and an inner wall surface of the nonmagnetic adjoining layer 17) and its periphery (the surface of the mask layer 51). In this case, a magnetic material similar to that of the main magnetic-pole layer 16 is used, for example.

Then, the seed layer 16S is utilized as an electrode film to grow a metal-coating layer 16M, in such a manner as to embed the opening 17K. In this case, a magnetic material similar to that of the main magnetic-pole layer 16 is used, for example. Also, a thickness thereof is provided sufficiently to embed not only the opening 17K but also the opening 51K and to further cover the seed layer 16S in a periphery thereof, in order to planarize the metal-coating layer 16M in the later process, for example.

Then, as illustrated in FIG. 7, a CMP method or the like is used to polish (planarize) the metal-coating layer 16M, so as to remain only a portion embedded in the openings 17K and 51K. In this case, the polishing process is performed until the mask layer 51 is exposed. Incidentally, the polishing may be performed excessively as necessary in order to ensure that the mask layer 51 is exposed.

Finally, as illustrated in FIG. 8, an ion-milling method or the like is used to remove the mask layer 51, so as to remain only a portion of the seed layer 16S and a portion of the metal-coating layer 16M embedded in the opening 17K. In this case, the etching process is performed until the nonmagnetic adjoining layer 17 is exposed. Incidentally, the etching may be performed excessively as necessary in order to ensure that the nonmagnetic adjoining layer 17 is exposed.

Thereby, the tip portion 16A (the seed layer 16S and the metal-coating layer 16M) illustrated in FIG. 2 is formed.

Figure 9:
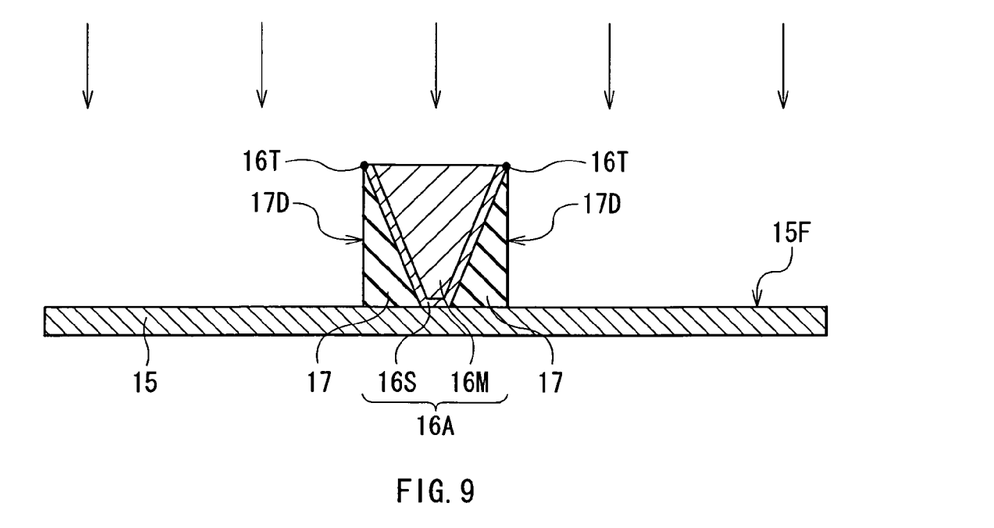
FIG. 9 is a cross-sectional view for describing a process subsequent to that of FIG. 8.

Then, as illustrated in FIG. 9, a RIE method or the like is used to etch the nonmagnetic adjoining layer 17 by utilizing the tip portion 16A as a mask, to remain portions adjacent to the tip portion 16A in the track-width direction. When using the RIE method, a type, a composition, and so forth of an etching gas are adjusted to control a selection ratio so that the etching rate of the tip portion 16A becomes significantly slower than the etching rate of the nonmagnetic adjoining layer 17. In this case, since the nonmagnetic foundation layer 15 functions as the etching stop layer, the etching process substantially completes at the time when the nonmagnetic foundation layer 15 is exposed.

In this etching process, the nonmagnetic adjoining layer 17 is sufficiently etched in a peripheral region of the tip portion 16A (a region out of the shade of the tip portion 16A in a direction of etching), whereas the nonmagnetic adjoining layer 17 is hardly etched in a vicinity region of the tip portion 16A (a region under the shade of the tip portion 16A in the etching direction). For this reason, the outermost edge portions 16T in the track-width direction of the tip portion 16A are located on the same plane as the etching surfaces (side faces 17D) of the nonmagnetic adjoining layer 17. Also, when the selection ratio is normalized, the nonmagnetic adjoining layer 17 is etched downwardly in a vertical direction in the region out of the shade of tip portion 16A, so that the side faces 17D become almost perpendicular to the surface plane 15F of the nonmagnetic foundation layer 15. As a result, a cross-sectional geometry of an aggregation of the tip portion 16A and the nonmagnetic adjoining layer 17 becomes virtually rectangular in shape.

Incidentally, when etching the nonmagnetic adjoining layer 17, other etching method such as an ion-milling method may be used instead of the RIE method. In this case, a mask such as a photoresist pattern may be formed on the tip portion 16A, and thereafter, the mask may be utilized to etch the nonmagnetic adjoining layer 17, for example.

Figure 10:
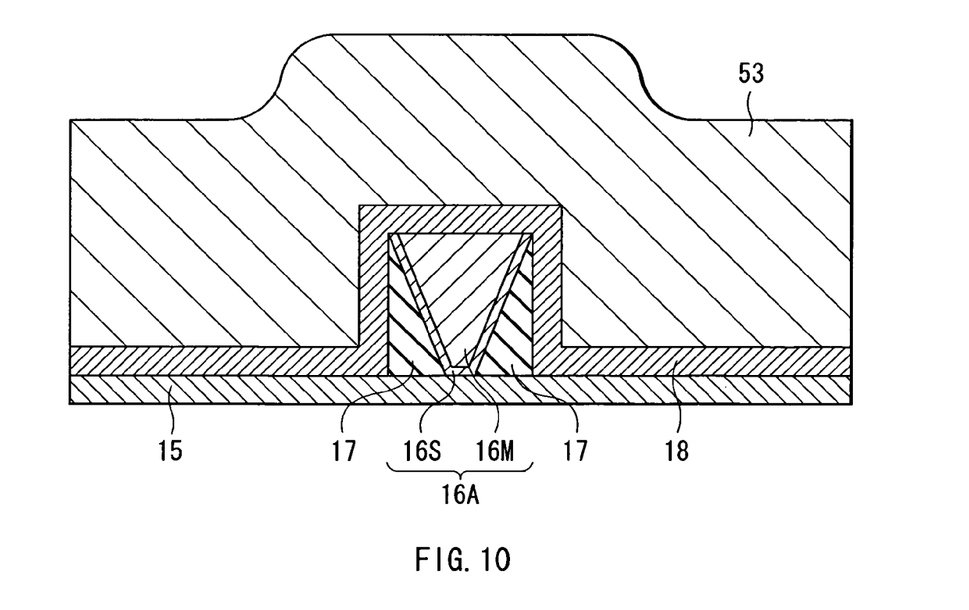
FIG. 10 is a cross-sectional view for describing a process subsequent to that of FIG. 9.

Then, as illustrated in FIG. 10, a sputtering method or the like is used to form the nonmagnetic protruding layer 18 in such a manner as to cover the tip portion 16A and the nonmagnetic adjoining layer 17 as well as the nonmagnetic foundation layer 15 in a periphery thereof. In this case, it is preferable that a material, by which the nonmagnetic protruding layer 18 can be utilized as a polishing stop layer in performing a polishing process by using a CMP method or the like in a later process (for example, ruthenium etc.), be used, for example. Incidentally, as a formation method of the nonmagnetic protruding layer 18, for example, an evaporation method, a chemical vapor deposition (CVD: chemical vapor deposition) method, an atomic layer deposition (ALD: atomic layer deposition) method, or the like may be used for a vapor phase growth, other than the sputtering method.

Then, a dummy metal-coating layer 53 is so formed as to cover the nonmagnetic protruding layer 18. In this case, a magnetic material such as Permalloy is used, for example. Also, a thickness of the dummy metal-coating layer 53 is provided sufficiently to completely embed a step formed in the tip portion 16A and a periphery thereof, in order to planarize the dummy metal-coating layer 53 in a later process. Incidentally, when the nonmagnetic protruding layer 18 is formed by using a nonmagnetic conductive material, the nonmagnetic protruding layer 18 may be used as an electrode film to grow the dummy metal-coating layer 53, for example.

Figure 11:
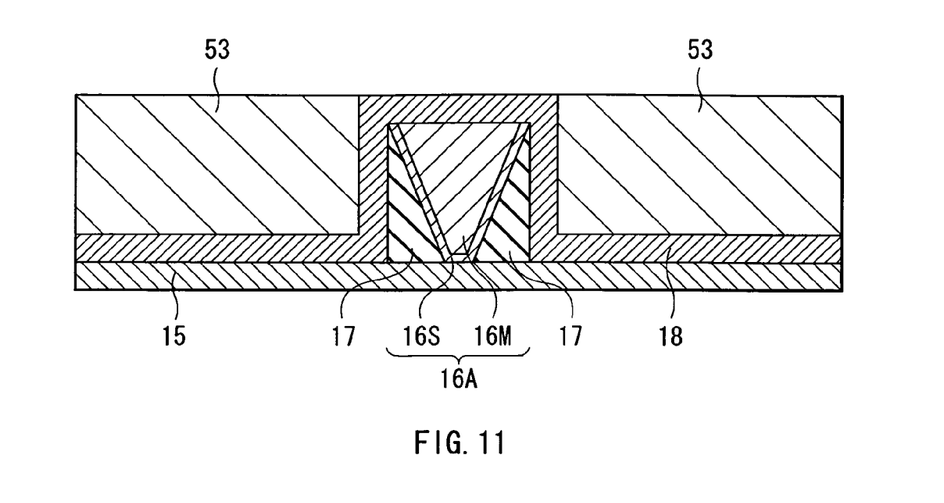
FIG. 11 is a cross-sectional view for describing a process subsequent to that of FIG. 10.

Then, as illustrated in FIG. 11, a CMP method or the like is used to polish and planarize the dummy metal-coating layer 53. In this case, since the nonmagnetic protruding layer 18 functions as the polishing stop layer, the polishing process substantially completes at the time when the nonmagnetic protruding layer 18 is exposed, for example.

Figure 12:
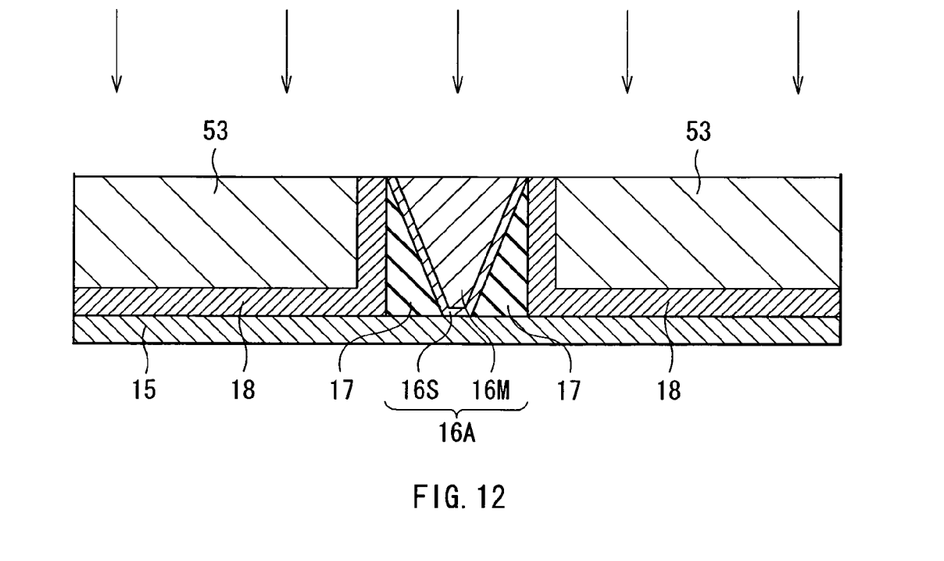
FIG. 12 is a cross-sectional view for describing a process subsequent to that of FIG. 11.

Then, as illustrated in FIG. 12, an ion-milling method or the like is used to etch a part of the nonmagnetic protruding layer 18 and a part of the dummy metal-coating layer 53 to remove the same. In this case, the etching process is performed until the nonmagnetic protruding layer 18 covering the tip portion 16A is removed and the tip portion 16A is exposed, for example.

Figure 13:
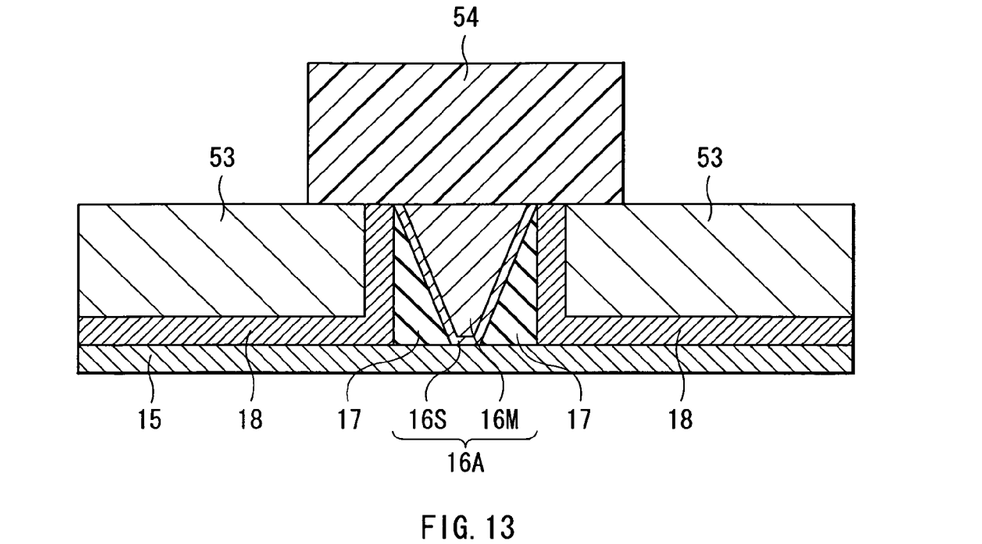
FIG. 13 is a cross-sectional view for describing a process subsequent to that of FIG. 12.
Figure 14:
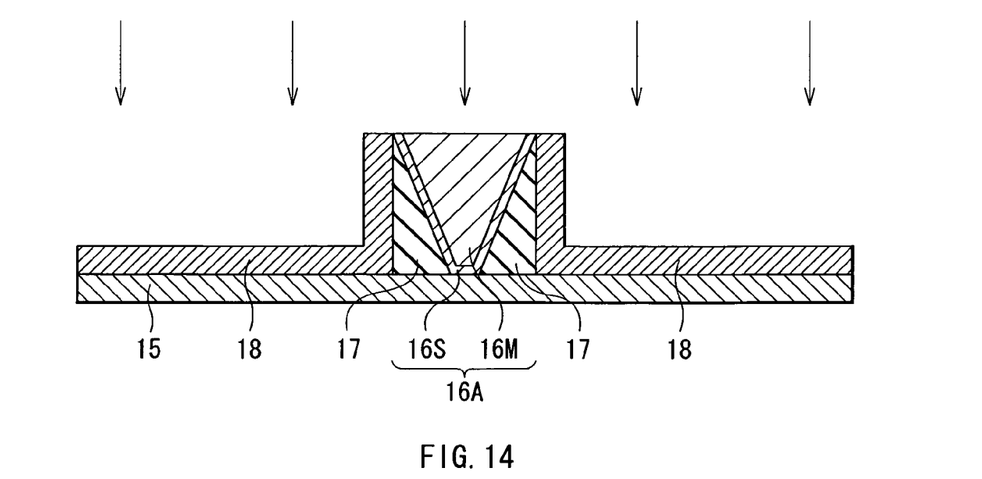
FIG. 14 is a cross-sectional view for describing a process subsequent to that of FIG. 13.

Then, as illustrated in FIG. 13, a photolithography method is used to form a photoresist pattern 54 at least on the tip portion 16A. Then, an ion-milling method or the like is used to each the dummy metal-coating layer 53 by utilizing the photoresist pattern 54 as a mask, so as to remove the dummy metal-coating layer 53 and to expose the nonmagnetic protruding layer 18, as illustrated in FIG. 14. In this etching process, the tip portion 16A may be partially etched from the trailing side together with the dummy metal-coating layer 53, so that the thickness thereof is more decreased on the side close to the air bearing surface 40 than on the side far from the air bearing surface 40, for example. This is for concentrating the magnetic flux flowing inside of the tip portion 16A on the air bearing surface 40. In this case, the thickness of the tip portion 16A may be decreased gradually toward the air bearing surface 40 (a taper formation), or the thickness may be decreased in a step-by-step fashion (a step formation).

Figure 15:
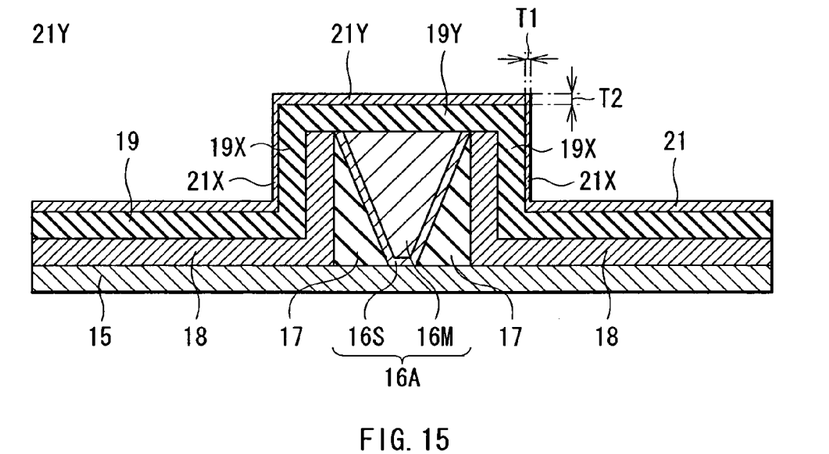
FIG. 15 is a cross-sectional view for describing a process subsequent to that of FIG. 14.

Then, as illustrated in FIG. 15, a sputtering method or the like is used to form the nonmagnetic gap layer 19 (including the nonmagnetic side gap layer 19X and the nonmagnetic trailing gap layer 19Y) in such a manner as to cover the tip portion 16A and the nonmagnetic protruding layer 18. Thereafter, a sputtering method or the like is used to form the magnetic seed layer 21 on the nonmagnetic gap layer 19. In this case, for example, an evaporation method, a CVD method, an ALD method, or the like may be used for the vapor phase growth, other than the sputtering method. Thereby, the tip portion 16A is covered from the three directions by the nonmagnetic gap layer 19 and the magnetic seed layer 21.

As is apparent from FIG. 15, a difference in a deposition amount (a thickness) of a formation material of the magnetic seed layer 21 occurs when the magnetic seed layer 21 is formed, due to a fact that a step is generated between a formation region of the tip portion 16A and a peripheral region thereof. More specifically, when a sputtering method or the like in which the formation material is deposited downwardly in the vertical direction is used as the forming method of the magnetic seed layer 21, the formation material is less likely to be deposited on the face along the deposition direction, whereas the formation material is more likely to be deposited on the plane perpendicular (opposed) to the deposition direction. Thus, in the magnetic seed layer 21, a thickness T1 of a portion 21X formed on the nonmagnetic side gap layer 19X becomes thinner than a thickness T2 of a portion 21Y formed on the nonmagnetic trailing gap layer 19Y.

Figure 16:
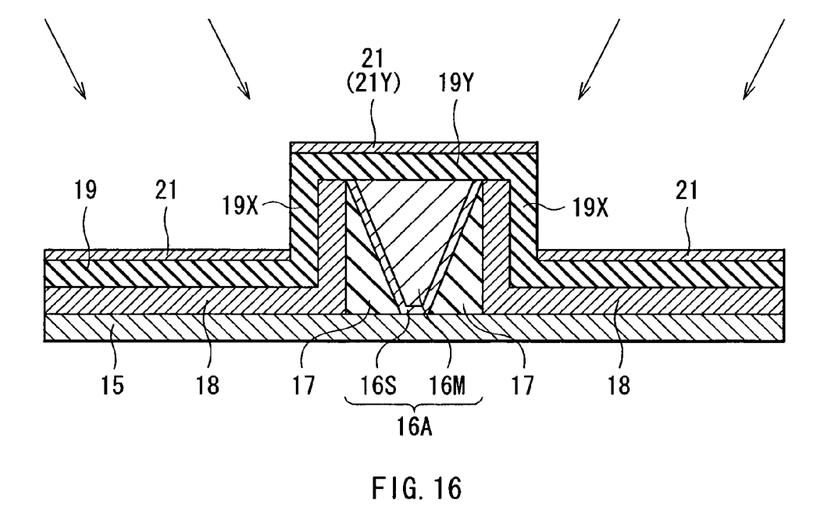
FIG. 16 is a cross-sectional view for describing a process subsequent to that of FIG. 15.

Then, an ion-milling method or the like is used to etch the magnetic seed layer 21, so as to remove only the portion 21X formed on the nonmagnetic side gap layer 19X in the magnetic seed layer 21 surrounding the tip portion 16A from the three directions, as illustrated in FIG. 16. In this case, a range of etching and an amount of etching may be adjusted so as to allow the portion 21X formed on the nonmagnetic side gap layer 19X to be etched on a priority basis and to allow the portion 21Y formed on the nonmagnetic trailing gap layer 19Y to be hardly etched in the magnetic seed layer 21, by inclining a direction of irradiation of an ion beam relative to a perpendicular of the surface of the nonmagnetic foundation layer 15 (in a Z-axis direction indicated in FIG. 2A).

In this etching process, the portions 21X and 21Y in the magnetic seed layer 21 are etched together. However, since the thickness T1 of the portion 21X is thinner than the thickness T2 of the portion 21Y, the portion 21Y is not completely removed yet when the etching process is ended at the time when the portion 21X is completely removed (eliminated). Thus, only the portion 21Y remains.

Figure 17:
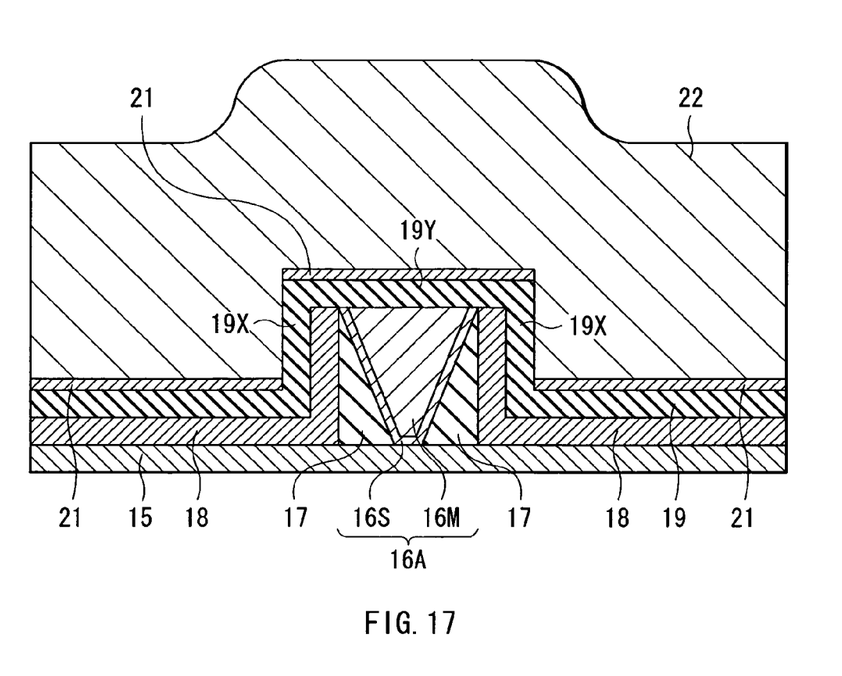
FIG. 17 is a cross-sectional view for describing a process subsequent to that of FIG. 16.

Then, as illustrated in FIGS. 2 and 17, the main write shield layer 22 is formed on the nonmagnetic gap layer 19 and the magnetic shield layer 21. A procedure of forming the main write shield layer 22 is, for example, as follows.

First, as illustrated in FIG. 17, an electroplating method or the like is used to form the main write shield layer 22 in such a manner as to cover the nonmagnetic gap layer 19 and the magnetic seed layer 21. In this case, at least the magnetic seed layer 21 formed on the nonmagnetic trailing gap layer 19Y is used as an electrode film to grow a plating film. Also, the thickness of the main write shield layer 22 is provided sufficiently so as to be able to completely embed the step formed in the tip portion 16A and the periphery thereof, in order to planarize the main write shield layer 22 in a later process.

Thereafter, a CMP method or the like is used to polish (planarize) the main write shield layer 22. Thereby, the main write shield layer 22 is so formed as to surround the tip portion 16A from the three directions through the nonmagnetic gap layer 19 and the magnetic seed layer 21, as illustrated in FIG. 2. As necessary, a protective layer (not illustrated) may be formed thereafter on the main write shield layer 22.

Then, the substrate 1, on which a plurality of stacked structure including the series of elements described above are arranged in matrix, are cut to obtain a plurality of bars (slider bars), and the slider bar is then pre-polished to adjust the dimensions of the read head portion 100A and the write head portion 100B. Thereafter, a CMP method or the like is used to form the air bearing surface 40.

Finally, an ion-milling method, a plasma-etching method, or the like is used to each the air bearing surface 40, in order to purify (cleaning) the air bearing surface 40. In this etching process, the nonmagnetic protruding layer 18 protrudes from the tip portion 16A, due to the difference in the etching rate between the tip portion 16A and the nonmagnetic protruding layer 18. Namely, because of the difference in the etching rate among the tip portion 16A, the nonmagnetic adjoining layer 17, the nonmagnetic protruding layer 18, the nonmagnetic gap layer 19, and the main write shield layer 22, the positions of the one end surfaces thereof on the air bearing surfaces 40 side differ. In this case, the nonmagnetic protruding layer 18 protrudes from the air bearing surface 40 (the tip portion 16A), whereas the nonmagnetic adjoining layer 17 and the nonmagnetic gap layer 19 are recessed from the air bearing surface 40. Thereby, the main part of the thin-film magnetic head completes. Thereafter, the slider bar is cut out for each thin-film magnetic head to be a plurality of chips (sliders).

[Effect and Result of Thin-Film Magnetic Head and Method of Manufacturing the Same]

In the thin-film magnetic head and the method of manufacturing the same according to this embodiment, the nonmagnetic gap layer 19 (the pair of nonmagnetic side gap layers 19X and the nonmagnetic trailing gap layer 19Y) is formed in the three directions of the tip portion 16A, and the main write shield layer 22 is so formed as to surround the tip portion 16A from the three directions through the nonmagnetic gap layer 19. Also, the magnetic seed layer 21, having the higher saturation magnetic flux density than the main write shield layer 22, is formed only between the nonmagnetic trailing gap layer 19Y and the main write shield layer 22. Thus, it is possible to increase the magnetic field gradient of the perpendicular magnetic field, and to suppress a generation of a side erase for the reasons set forth below.

Figure 18:
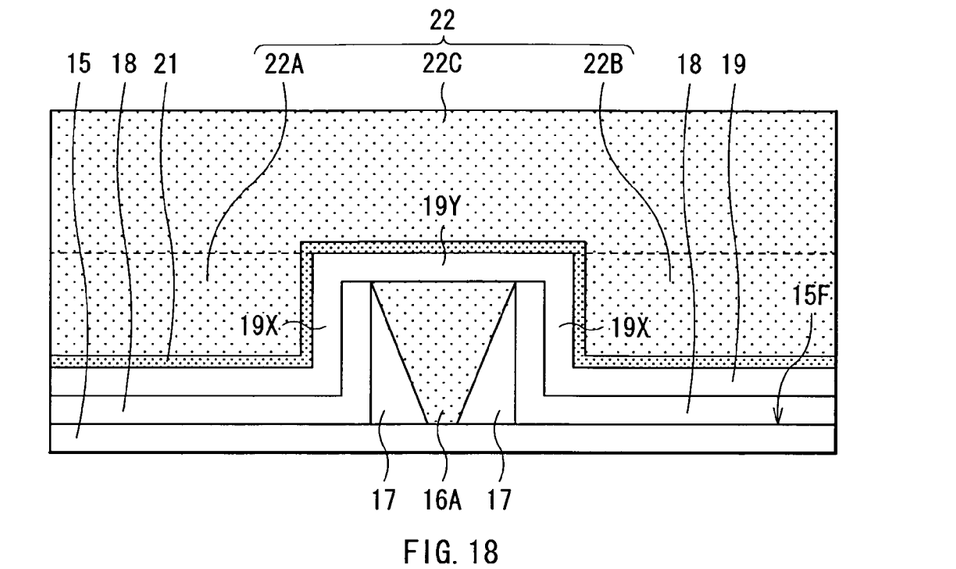
FIG. 18 is a view illustrating a configuration of a thin-film magnetic head according to a first comparative example.
Figure 19:
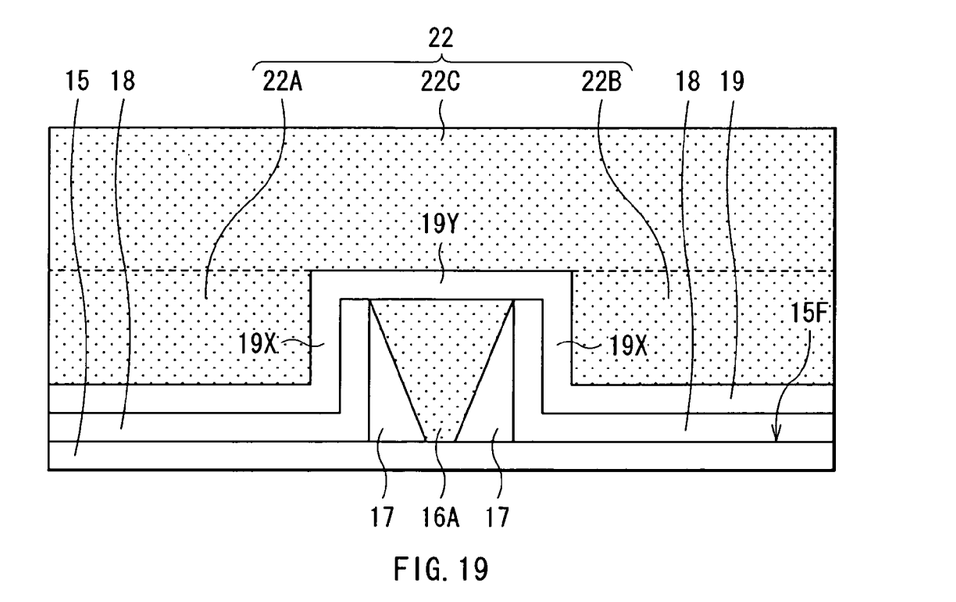
FIG. 19 is a view illustrating a configuration of a thin-film magnetic head according to a second comparative example.

FIGS. 18 and 19 illustrate configurations of thin-film magnetic heads according to comparative examples, and illustrate cross sections corresponding to FIG. 2, respectively. The thin-film magnetic head according to the first comparative example illustrated in FIG. 18 has a configuration similar to that of the thin-film magnetic head according to this embodiment, except that the magnetic seed layer 21 is formed not only between the nonmagnetic trailing gap layer 19Y and the main write shield layer 22, but also between the nonmagnetic side gap layer 19X and the main write shield layer 22. The thin-film magnetic head according to the second comparative example illustrated in FIG. 19 has a configuration similar to that of the thin-film magnetic head according to this embodiment, except that the magnetic seed layer 21 is not formed.

In the first comparative example, the magnetic seed layer 21 of the high saturation magnetic flux density is formed on the both sides and on the trailing side of the tip portion 16A, as illustrated in FIG. 18. In this case, in the down-track direction, a magnetic flux released from the tip portion 16A becomes more likely to be absorbed in the magnetic seed layer 21 of the high saturation magnetic flux density, so that the magnetic field gradient of the perpendicular magnetic field increases. However, in the cross-track direction, the magnetic flux released from the tip portion 16A becomes more likely to be absorbed in the magnetic seed layer 21 of the high saturation magnetic flux density, and the magnetic flux becomes more likely to spread in the track-width direction. Thus, the side erase is more likely to be generated.

In the second comparative example, the magnetic seed layer 21 is formed neither on the both sides nor on the trailing side of the tip portion 16A, as illustrated in FIG. 19. In this case, the magnetic flux becomes less likely to spread in the cross-track direction, so that the side erase is less likely to be generated. However, in the down-track direction, the magnetic flux released from the tip portion 16A is less likely to be absorbed by the main write shield layer 22 of a low saturation magnetic flux density, so that the magnetic field gradient of the perpendicular magnetic field is less likely to increase.

In contrast, according to this embodiment, the magnetic seed layer 21 of the high saturation magnetic flux density is formed only on the trailing side of the tip portion 16A, and the magnetic seed layer 21 is not formed on the both sides of the tip portion 16A, as illustrated in FIG. 2. In this case, in the down-track direction, the magnetic flux released from the tip portion 16A becomes more likely to be absorbed in the magnetic seed layer 21, so that the magnetic field gradient of the perpendicular magnetic field increases. In addition thereto, the magnetic flux released from the tip portion 16A becomes less likely to spread in the cross-track direction, so that the side erase is less likely to be generated. The tendency, in which the magnetic field gradient increases in the down-track direction and the generation of the side erase is suppressed in the cross-track direction, is obtained similarly even when a magnetic field intensity of the perpendicular magnetic field is increased. Therefore, since a trade-off relationship on the magnetic field gradient and the side erase is overcome, it is possible to increase the magnetic field gradient while suppressing the generation of the side erase.

Although the invention has been described hereinbefore with reference to the embodiment, the invention is not limited to the mode described as the embodiment, and various modifications are possible. For example, although the perpendicular magnetic write head and the method of manufacturing the same according to the invention are applied to the composite head, it is not necessarily limited thereto. It may be applied to a recording-dedicated head not equipped with a read head portion.

What is claimed is:

1. A perpendicular magnetic write head, comprising:
   a magnetic pole;
   a pair of first nonmagnetic gap layers provided on both sides in a track-width direction of the magnetic pole;
   a second nonmagnetic gap layer provided on a trailing side of the magnetic pole;
   a pair of third nonmagnetic gap layers provided on opposing outer sides of the pair of first nonmagnetic gap layers in the track width direction:
   a magnetic shield layer so provided as to surround the magnetic pole with the first to third nonmagnetic layers in between; and
   a magnetic seed layer formed between the second nonmagnetic gap layer and the magnetic shield layer, and between the third nonmagnetic gap layer and the magnetic shield layer, the magnetic seed layer having a saturation magnetic flux density higher than that of the magnetic shield layer,
   wherein the magnetic seed layer is not formed between the first nonmagnetic gap layer and the magnetic shield layer.

2. A method of manufacturing a perpendicular magnetic write head, comprising:
   forming a magnetic pole;
   forming a pair of first nonmagnetic gap layers on both sides in a track-width direction of the magnetic pole;
   forming a second nonmagnetic gap layer on a trailing side of the magnetic pole;
   forming a pair of third nonmagnetic gap layers outside of the pair of first nonmagnetic gap layers in the track width direction;
   forming a magnetic seed layer on the first to third nonmagnetic gap layers;
   selectively removing a layer portion formed on the first nonmagnetic gap layer, of the magnetic seed layer covering the first to third nonmagnetic gap layers; and
   so forming a magnetic shield layer as to surround the magnetic pole with the first to third nonmagnetic gap layers, and a remaining portion of the magnetic seed layer in between,
   wherein a material with a saturation magnetic flux density higher than that of the magnetic shield layer is used for formation of the magnetic seed layer.

3. The method of manufacturing the perpendicular magnetic write head according to claim 2,
   wherein an etching method is employed to selectively remove the layer portion of the magnetic seed layer, and
   a plating film is allowed to grow with use of at least the remaining portion of the magnetic seed layer so as to form the magnetic shield layer.

* * * * *